Aug. 1, 1961   E. J. CATTABIANI   2,994,795
CONSTRUCTION FOR DYNAMOELECTRIC MACHINE
Filed March 21, 1957   3 Sheets-Sheet 1

United States Patent Office

2,994,795
Patented Aug. 1, 1961

2,994,795
CONSTRUCTION FOR DYNAMOELECTRIC MACHINE
Eugene J. Cattabiani, Penn Township, Allegheny County, Pa., assignor to Westinghouse Electric Corporation, East Pittsburgh, Pa., a corporation of Pennsylvania
Filed Mar. 21, 1957, Ser. No. 647,657
27 Claims. (Cl. 310—86)

The instant invention relates to dynamoelectric machinery, and more particularly, to a housing and associated supporting structures arranged for use with sealed motor-pump units, electric motors, and the like.

A motor-pump unit of the character described is usually furnished in an integral or permanently connected combination or unit which is sealed within a common housing structure. In those applications wherein the motor-pump is sealed permanently into the fluid system, the rotor and stator of the motor-pump are provided with hermetically sealed enclosures and, when used with fluids maintained at elevated temperatures, are separated from a pumping volute formed within the housing by a suitable thermal barrier.

Heretofore, it has been the practice to secure and seal the component parts of the housing by welding or with the use of large numbers of mounting bolts. When assembled in this fashion, the housing is difficult to disassemble for repair and maintenance of the motor-pump sealed therein. The use of these assembly methods furthermore complicated the housing structure of the motor-pump and thus increased the time and expense consumed in the fabrication thereof. The resulting complex design of the component parts of prior motor-pumps has required special machining procedures in the manufacture thereof and, therefore, has increased further the cost of prior machines. In prior motor-pump structures when being used with hot or corrosive fluids undesirable leakage frequently occurs from the pumping volute into the motor section of the motor-pump unit, with resultant overheating in the motor section.

Accordingly, an object of the present invention is to provide more efficient housing and associated structures of a motor-pump unit or other dynamoelectric machine.

More specifically, it is an object of the invention to reduce the number of component parts, such as bolts and screws, of a motor-pump or other dynamoelectric structure, and to facilitate assembly and disassembly thereof.

Another object of the invention is to furnish an improved sealing means adapted particularly for use with a dynamoelectric machine, for example, a motor-pump unit.

A further object of the invention is to furnish an improved thermal barrier for use in conjunction with the housing structure of a motor-pump unit.

These and other objects, features and advantages of the invention will be made apparent during the forthcoming description of illustrative forms of the invention, with the description being taken with the accompanying drawings, wherein.

Figure 1:
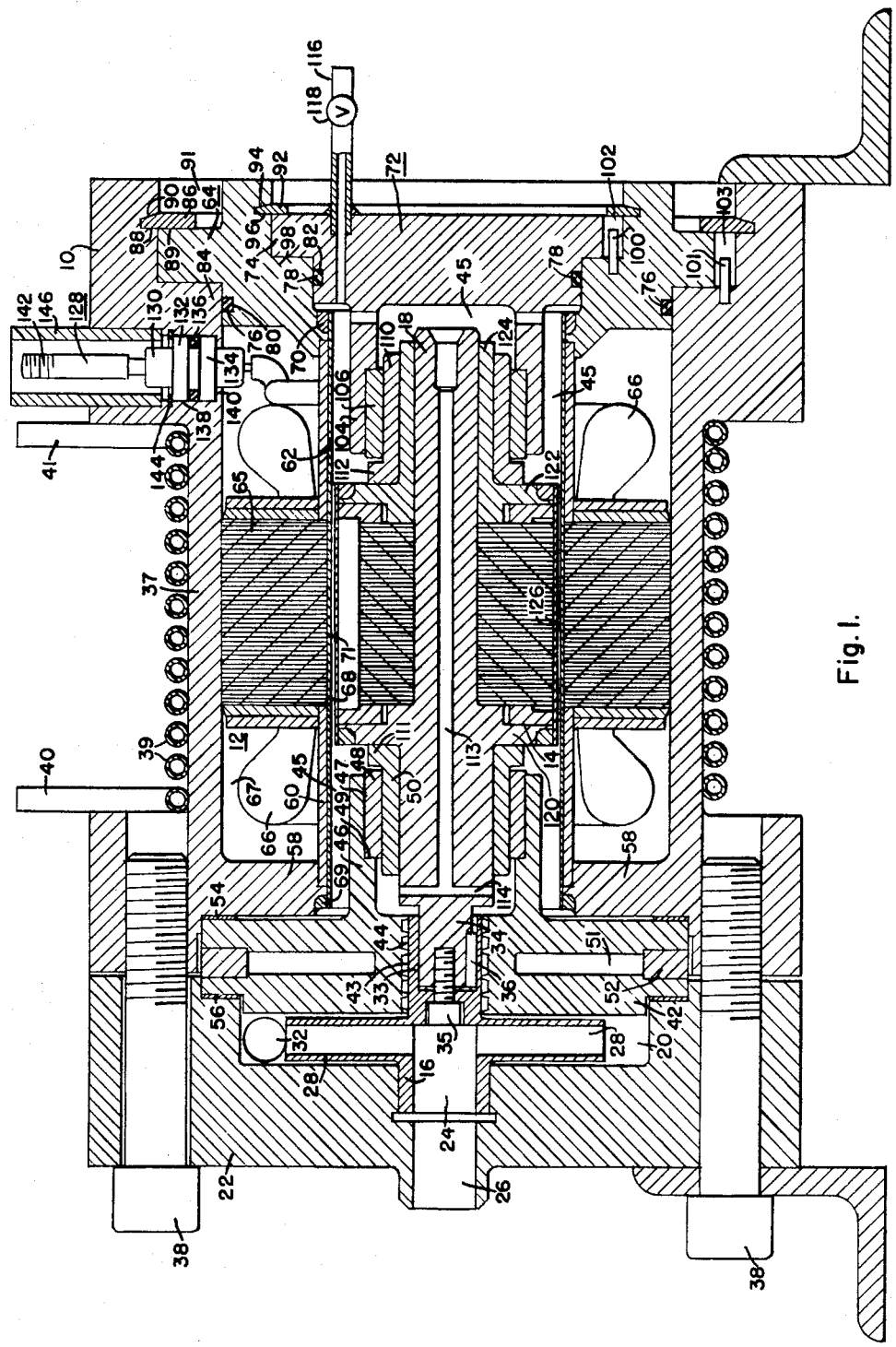
FIGURE 1 is a central longitudinal sectional view of a motor-pump unit and housing constructed in accordance with the principles of this invention.

According to the invention, means are provided in association with the housing structure of a motor-pump combination for quickly and efficiently sealing the component parts thereof. One form of such sealing means is adapted for association with an improved thermal barrier utilized in conjunction with the motor-pump structure, when the latter is used for pumping fluids at elevated temperatures. The component parts of the motor-pump structure are adapted for quick and efficient assembly thereof and for the ready manufacture of the aforesaid parts, as by casting. Once assembled, the motor-pump structure of the invention is arranged for facile disassembly thereof for maintenance or repairs.

Referring now more particularly to the drawing, the exemplary form of the invention illustrated therein comprises a housing 10, a stator 12, a rotor 14 and impeller 16 supported upon a common driving shaft 18. The impeller 16 is thus arranged by the driving shaft 18 within the pumping volute 20 formed in an end plate 22. A central cavity 24 of the impeller 16 communicates with a main fluid stream inlet 26 formed centrally through the end plate. From the cavity 24, the fluid is discharged centrifugally through the channeled arms 28 of the impeller into the volute 20 and exits by way of the outlet conduit 32. The impeller 16 is provided with an inwardly extending tubular projection 33 into which a necked-down portion 34 of the drive shaft 18 is inserted and secured therewithin by an impeller mounting bolt 35. Turning movement of the shaft 18 relative to the tubular projection 33 and the impeller 16 is positively prevented by means of the key and groove arrangement, indicated generally by the reference character 36.

The end plate 22 is secured to a tubular housing section 37 by means of mounting bolts 38. The housing section 37 is provided with a stator cooling coil 39 on the outer surface thereof through which a suitable coolant is circulated by way of the inlet and outlet conduits 40 and 41. Clamped between the housing member 37 and the end plate 22 is a thermal barrier 42 having generally a discoidal configuration and having a central aperture 43 which is disposed in alignment with the main fluid stream inlet 26. The walls of the aperture 43 are arranged to form a labyrinth seal 44 for the purpose of preventing substantial leakage of fluid from the volute 20 into the internal passages 45 of the motor section. Symmetrically surrounding the central aperture 43 and secured to the inward face of the thermal barrier 42 is a tubular projection 46 having formed thereon a suitably placed indent 47. A sleeve type bearing 48 is inserted into the indent 47 and is positioned by end wall 49 of the indent 47. The bearing sleeve 48 is adapted to engage and to support a shaft journal bearing member 50 which is secured to the shaft 18 in any suitable manner, as by shrink fitting.

The thermal barrier 42 is provided with an annular air space 51 which is formed centrally therein and which is closed at the outward opening thereof by the annular ring member 52. The ring member 52 can be arranged in the shape of a snap ring, or alternatively, provided in a segmented arrangement, either form of which can be welded or otherwise sealed to the thermal barrier 42. Means are provided for preventing leakage of the main fluid stream from the pumping or volute section 20 of the motor-pump unit past the outer periphery of the thermal barrier 42 and into the air space 51 thereof, or into the internal passages 45 of the motor section. One form of such leakage preventing means includes a double gasket arrangement comprising upper and lower gasket members 54 and 56 inserted respectively between the engaging surfaces of the housing section 37, the end plate 22 and the thermal barrier 42. By extending the thermal barrier 36 into clamping engagement with both the end plate 22 and the housing section 37, the thermal barrier 42 is provided with a large diameter with the result that the diameter of the air space 51 is increased accordingly and thus, lies substantially coextensively with the pumping volute 20. With this arrangement, leakage around the outer periphery of the thermal barrier is prevented and a more efficacious thermal shielding of the volute 20 is afforded.

Inserted into the housing section 37 is the aforementioned stator structure 12, which is positioned relative to the housing section 37 by engagement with an integrally formed and inwardly etxending flange 58 of the housing section 37 and by means of a backing-up sleeve 60 joined to the flange 58 and to one end of the stator structure 12. A similar backing-up sleeve 62 is secured to the other end of the stator 12 and is supported at its outward end by a detachably mounted, stepped stator retaining annulus 64, presently to be described in greater detail.

The stator comprises a core 65 fabricated from a magnetic material and provided with a number of winding slots (not shown) adjacent the base thereof. Inserted into each of the slots are the stator windings, the end turns of which are indicated at 66. Spaces 67 surrounding the end turns 66 of the stator 12, in one example, are filled with a potting compound having good thermal conductivity to facilitate cooling the stator windings. In those applications wherein the motor-pump unit is utilized in a sealed system, the stator structure 12 is sealed from the balance of the motor-pump combination by employing a sealed enclosure or "can" 68 welded or otherwise sealed to the housing section flange 58 and to the retaining annulus 64 by means of annular sealing welds 69 and 70, respectively. When thus secured, the stator can 68 is supported by the backing-up sleeves 60 and 62 and by the inner periphery 71 of the stator 12.

The motor end of the shaft 18 is positioned and supported for rotative movement by a retaining disc 72. The retaining disc 72 is arranged with a shoulder 74 whereby the disc 72 engages inwardly facing stepped portions of the retaining annulus 64. The retaining disc and the retaining annulus are secured relative one to another and to the housing section 37 through usage of detachable sealing and supporting means presently to be described. When supported in this fashion, the rotor 14 and shaft 18 can be removed from the motor-pump unit simply by removing the impeller bolt 35 and the retaining disc 72, after which the shaft and rotor easily can be withdrawn through the opening in the annulus 64. In order to remove the stator 12, it is only necessary to break the sealing weld 70 or other sealing means, then remove the retaining annulus 64 and retaining disc 72 from the housing section 37 and to withdraw the stator 12, together with the backing-up sleeves 60 and 62, without disturbing the rotor 14 and its associated parts.

One form of the aforementioned sealing and securing means, as adapted for use in this application of the invention, includes the use of O-rings 76 and 78, respectively, inserted into suitable recesses 80 and 82 of the retaining annulus 64 and the retaining disc 72, respectively. Thus, the engaging surfaces between the retaining disc 72, the retaining annulus 64 and the housing section 34 are individually sealed by the aforesaid O-rings. The retaining annulus 64 is detachably secured to the housnig section 37 between a shoulder 84 thereof and a removable snap ring 66 inserted into an annular groove 88 formed in the inner periphery of the casing section 37 and engaging the stepped portion or shoulder 89 formed centrally and coextensively on the outer periphery of the retaining annulus. The engaging surfaces of the snap ring 86 and the groove 88 are inclined to the plane of the snap ring, as indicated by the reference character 90, in order to cause the snap ring 86 to exert an inward force on the retaining annulus 64 as the snap ring 86 expands into the annular groove 88. The radial width of the space 91 between the outer periphery of the retaining annulus 64 and the inner periphery of the housing section 37 is sufficient for lateral insertion of the snap ring 86 from the end of the housing section.

In a similar fashion, the retaining disc 72 is detachably secured to the retaining annulus 64 through the use of a snap ring 92 inserted into an annular groove 96 provided in the inner periphery of the stepped annulus 64. Thus, the inclined or tapered surfaces 94 of the snap ring 92 and the annular groove 96 operate to urge the shoulder 74 of the retaining disc 72 against a stepped portion 98 of the retaining annulus 64.

In this arrangement of the invention, the O-rings 76 and 78 are provided with a relatively smaller diameter with reference to that of the snap rings 86 and 92, respectively, in order to reduce the required sealing area formed thereby. On the other hand, the snap rings 86 and 92, respectively, are provided with a relatively larger diameter in order to increase the forces exerted thereby upon the associated annulus 64 and disc 72, and to reduce the shearing forces exerted at any unitary area upon the snap rings by the pressures developed within the motor-pump unit. Relative rotative movement between the retaining disc 72, the retaining annulus 64 and the housing section 37 is prevented positively through the use of pins 100 and 101, respectively secured to the retaining annulus 64 and the housing section 37. The pins 100 and 101 are inserted into grooves 102 and 103 formed respectively at the outer peripheries of the retaining disc and retaining annulus.

Alternatively, in the case of motor-pump units not having a canned stator, the retaining annulus 64 and the retaining disc 72, can be replaced by a single retaining member (not shown) having a diameter sufficient to engage the inner periphery of the housing section 37. In this latter arrangement, the retaining member can be secured in place by the single employment of the snap ring 86 and groove 88. When used with relatively lower pressures, the end plate 22 of the motor-pump arrangement illustrated in the drawing can be provided alternatively in the form of a single retaining member similar to that denoted by the reference character 198 of FIG. 3 but provided with a pumping volute 20. The last-mentioned retaining member can be secured and sealed to the housing section 37 at the opposite or pumping end thereof by using the snap ring and sealing O-ring arrangement presently to be described in connection with FIG. 3.

The retaining disc 72 is provided with an inwardly extending tubular extension 104 which is aligned with the projection 46 of the thermal barrier 42. The extension 104 is similarly indented at 106 for the insertion of a suitable bearing sleeve 108. The bearing sleeve 108 is adapted to engage and to support a journal bearing 110 secured to the driving shaft 18. Any thrust force imparted to the shaft 18 is absorbed by bearing contact of shoulders 111 or 112, formed integrally with the journal bearings 50 and 110, respectively, with the inward ends of the associated bearing sleeve 48 or 108.

By fabricating the journal bearings 50 and 110 from a slightly less wear-resistant material than the bearing sleeves 48 and 108, it will be apparent that the preponderant proportion of wear will then occur in the shaft bearings and that the latter can be replaced easily by the simple removal of the retaining disc 72, the impeller mounting bolt 35 and by withdrawing the driving shaft 18 together with the journal bearings 50 and 110 from the motor-pump unit.

The driving shaft 18 is formed with a longitudinally extending passage 113 which joins a laterally extending channel 114 extending through the driving shaft 18 adjacent one end thereof. The channels 113 and 114 are adapted to circulate suitable lubricating fluid through the bearing members 48 and 50 and 106 and 110, by way of the internal passages 45 of the motor section, as the driving shaft is rotated. Venting of any air contained in the motor section is accomplished by means of an air vent 116, which is closed by welding or by means of valve 118.

The driving shaft 18, in one arrangement of the invention, is further provided with an outwardly extending integral flange 120 which serves as one end plate of the rotor structure 14. To permit ready disassembly of the rotor 14, the other end plate 122 is fabricated from a separate casting having an integral collar 124 which is adapted to be secured in any convenient manner, such as threading or shrink-fitting, to the driving shaft 18 and to which the aforesaid journal bearing 110 is secured. In those applications where the motor-pump combination is sealed within a corrosive or hazardous fluid system, the rotor structure 14 may also be sealed or "canned" by means of a relatively thin cylindrical casing 126 placed over the rotor structure 14 and welded to the rotor end plates 120 and 122.

In the event of a leak of pressurized fluid through the sealed stator enclosure or can 66, the housing 10 is constructed in such manner that it can withstand safely the internal pressure of the motor section without failure or external leakage. In furtherance of this latter purpose, an electrical terminal 128 of the stator 12 of the motor-pump unit is suitably sealed. The terminal 128 includes a ceramic insulator 130 having outwardly extending flanged portions 132 and 134 spaced to form a radial groove therebetween. Inserted in the groove is an O-ring 136 which sealingly engages the walls of an opening 138 extending through a wall of the housing 37. A shoulder 140 is formed adjacent the inner end of the opening 138, upon which shoulder the flanged insulator 130 rests. As electrical conductor 142 is inserted through said insulator and is sealed thereto, for example, by brazing. The insulator 130 and the conductor 142 are secured in place by a snap ring 144, and the outwardly extending portions thereof are protected by an insulating tube 146 placed in the outer end of the opening 138.

Figure 2:
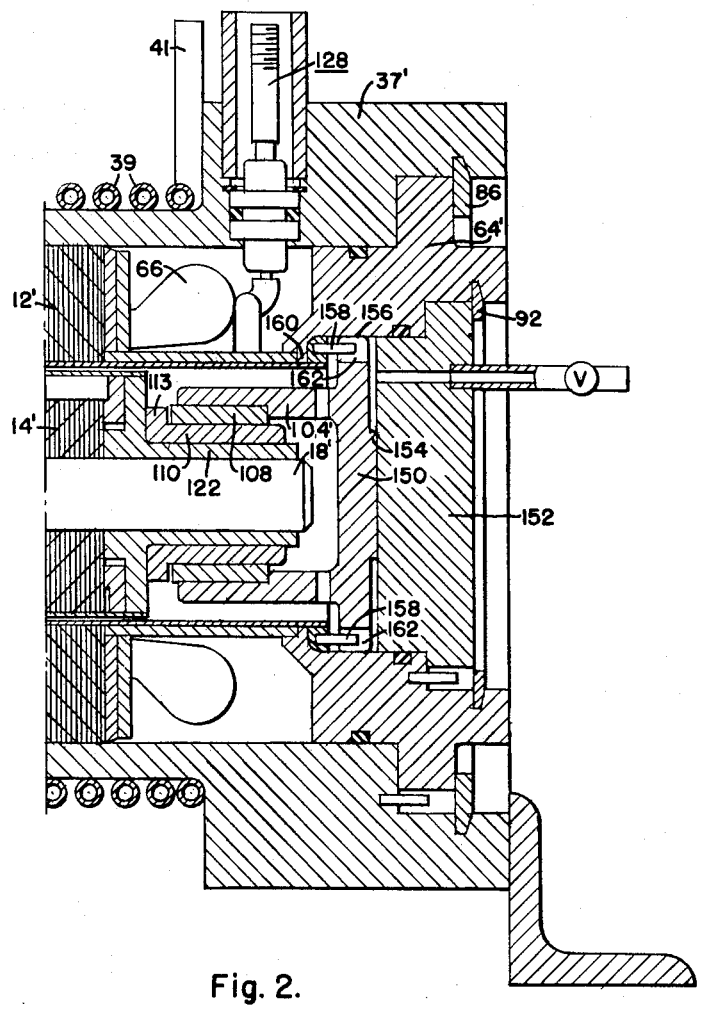
FIG. 2 is a partial, longitudinal sectional view of another form of dynamoelectric structure arranged pursuant to the invention; and, FIG. 3 is a longitudinal sectional view of still another form of dynamoelectric structure of the invention.

In another arrangement of the invention, shown in FIG. 2 of the drawings, the bearing extension 104' is secured to a separate bearing supporting plate 150, which is mounted inwardly of a retaining disc 152. An annular shoulder 154 is formed coaxially on the outward face of the bearing supporting plate 150 and engages the retaining disc 152 for properly spacing the bearing supporting plate therefrom. The supporting plate 150 is maintained coaxially of the driving shaft 18' by having its outer, circular periphery closely fitting a seat 156 formed on the inner periphery of the retaining annulus 64'. Turning movement of the supporting plate 150 relative to the motor housing section 37' and the retaining annulus 64' is prevented by means of pins 158 secured to annular rib 160 of the retaining annulus and inserted into grooves 162 of the supporting plate 150. With this latter arrangement, alignment of the bearing extension 104' with the intended rotational axis of the shaft is ensured at high operating speeds and pressures of the motor-pump unit. Moreover, the bearing supporting plate 150 is easily removable, together with the retaining disc 152, for withdrawing the rotor 14, shaft 18 and associated parts without disturbing the detachable retaining annulus 64' and removable stator 12.

Figure 3:
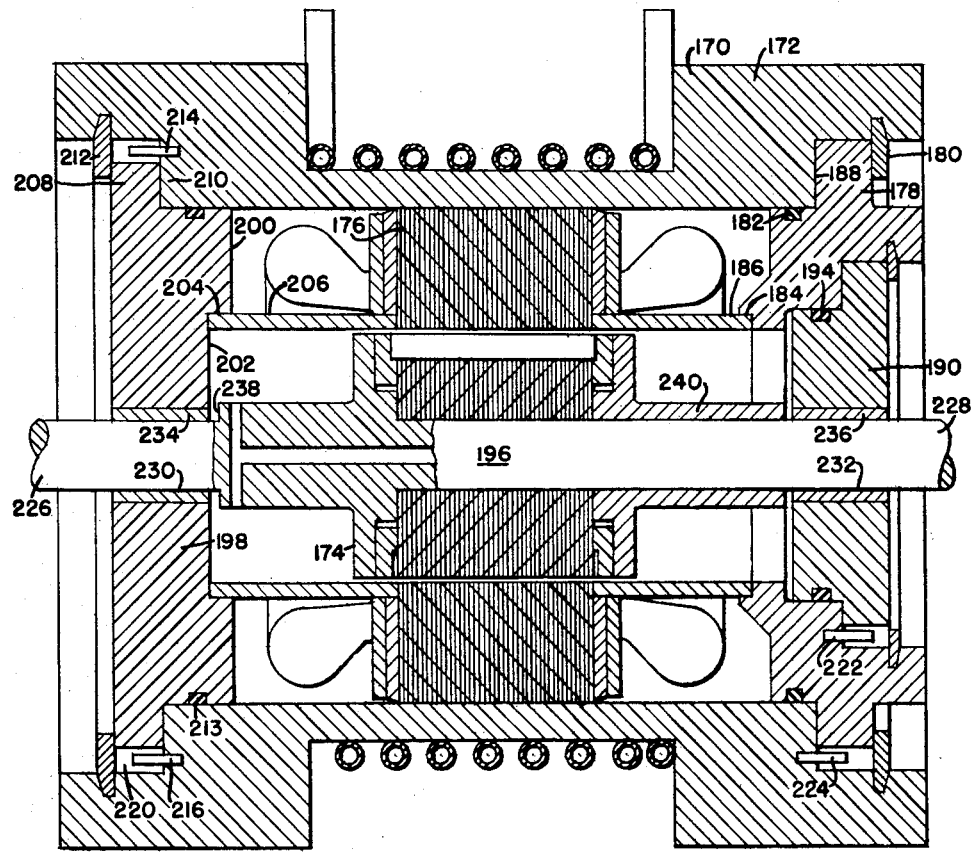

In the embodiment illustrated in FIG. 3, the invention is adapted for use with a dynamoelectric machine such as an electric motor. The housing 170 of the motor includes an elongated, substantially cylindrical housing section 172 which is closed, and sealed if desired, at either end thereof with one or more quick-detachable closures or retaining members similar to those described heretofore. The closures are arranged, at least at one end of the housing section, such that a repulsion-type rotor and shaft structure 174, or other type rotor, can be withdrawn upon removing one of the closures, without removing an adjacent detachable closure utilized to removably secure a stator structure 176 within the housing section 172.

One form of end closure includes a stator retaining annulus 178 similar in structure to the retaining annulus 64' and detachably secured and sealed at one end of the housing section 172 by means of a snap ring 180 and sealing O-ring 182, respectively. The retaining annulus 178 is provided with an annular indent 184 adapted to engage and to position a backing up sleeve 186 of the stator structure 176. The annulus 178 is stepped at its outer periphery for engagement with shoulder 188 of the housing section and at its inner periphery for engagement with a rotor retaining disc 190. The retaining disc 190 is detachably secured and sealed to the stator retaining annulus by means of a snap ring 192 and sealing O-ring 194, respectively. The snap rings 180 and 192 and the O-rings 182 and 184 are secured in suitable grooves as described heretofore in connection with FIG. 1 of the drawings. Thus, the snap rings 180 and 192 likewise are furnished of a larger diameter than the associated O-rings 182 and 194 in order to increase the total loading which can be applied to the snap rings and to decrease the shearing stresses at any unitary area thereof, in the event that thrust forces are imparted to the rotor shaft 196 or that the unit is pressurized.

The other end of the housing section 172 can be closed and sealed in the aforedescribed manner, or can be closed and sealed with another form of closure constructed in accordance with the invention. In the latter arrangement illustrated in FIG. 3, a unitary retaining member 198 is utilized. The retaining member 198 is provided with an inward face 200 which is coextensive with the outer diameter of the stator 176. The face 200 is indented or recessed at 202 to provide a shoulder 204. The shoulder 204 is aligned with the indent 184 of the stator retaining annulus 178 and thus, is arranged to receive and to support the other backing up sleeve 206. The outer periphery of the retaining member is formed into a flange or stepped portion 208 which engages a shoulder 210 of the housing section adjacent the said other end thereof. The retaining member 198 is secured in this position by means of a snap ring 212 which is retained in the housing section 172 in the manner described in connection with FIG. 1. Similarly, all of the snap rings 180, 192 and 212 and their associated grooves are provided desirably with inclined portions in order to provide inward thrust against the closures by expansion of the snap rings into the grooves. An O-ring and groove, indicated generally by the numeral 213 (FIG. 3) are disposed on the outer periphery of the retaining member 198 and adjacent the stepped portion 208 thereof for sealing the retaining member to the housing section 172.

The retaining member 198 is secured against rotative movement relative to the housing section 172 by means of pins 214 and 216 secured to the shoulder 210 of the housing section 172 and extending into grooves 218 and 220 formed at the outer periphery of the retaining member. In a similar manner, rotation of the retaining disc 190 relative to the retaining annulus 178 and rotation thereof relative to the housing section 172 is prevented by the pins 222 and 224, respectively. Obviously, a greater number of rotation-preventing pins can be utilized than that shown.

Where two operational shaft-extensions 226 and 228 from the dynamoelectric machine are required, aligned apertures 230 and 232 are formed centrally in both the retaining member 198 and the rotor retaining disc 190. A suitable bearing sleeve 234 or 236, or other antifrictional device, is inserted into each of the apertures 230 and 232 for engagement with the rotor shaft 196. Any thrust force imparted to the rotor shaft 196 is absorbed by bearing contact of shoulder 238 with the inward end of the bearing sleeve 234 or of the outward end of rotor end plate collar 240 with the inward end of the bearing sleeve 236. In the event that only one shaft-extension 226 or 228 is required, one or the other of the apertures 230 and 232 and the associated bearing sleeve can be omitted. The non-protruding end of the shaft, then, is intended to be supported by the bearing extension 46 or 104 (FIGS. 1 and 2), formed integrally with or otherwise secured to the retaining member 198 or the rotor retaining disc 190, and the associated bearing sleeve 48 or 108 (FIG. 1) and the journal bearing 50 or 110 (FIG. 1). Obviously, in those applications wherein it is not required to completely support the stator 176 and associated structure when the rotor 174 is withdrawn, the stator retaining annulus 178 and the rotor retaining disc 190 can be replaced by a unitary closure similar to the retaining member 198 with the result that each end of the housing section 172 will be closed identically in this case, with a retaining member 198.

From the foregoing, it will be apparent that novel and efficient constructions for dynamoelectric machines have been disclosed. Although the invention has been illustrated and described primarily in conjunction with a sealed motor-pump unit and an electric motor, it will be apparent that the structural arrangement disclosed herein can be adapted readily for use with other dynamoelectric machines. Therefore, numerous modifications of the invention will occur to those skilled in the art without departing from the scope of the appended claims. Furthermore, it is to be understood that certain features of the invention can be utilized without a corresponding use of other features.

I claim as my invention:

1. In a housing structure for a dynamoelectric machine, the combination comprising a tubular housing member having the opening at one end formed with an outward step to provide an enlarged outer end opening, a closure member also of stepped configuration to provide an inner portion having a cross section such as to fit closely within said housing inwardly of said step and an outer portion of larger cross section to fit relatively closely in said enlarged outer end opening, a resilient sealing ring seated in a groove provided in one of said members at a location inwardly of said step and sealingly engaging the other of said members, a resilient snap ring inserted into an annular groove formed in one of said members and engaging the other of said members at a location outwardly of said step, and means for closing the other end of said housing member.

2. In a housing structure for a dynamoelectric machine, the combination comprising a tubular housing member having the opening at one end formed with an outward step to provide an enlarged outer end opening; a closure member also of stepped configuration to provide an inner portion having a cross section such as to fit closely within said housing inwardly of said step and an outer portion of larger cross section to fit relatively closely in said enlarged outer end opening; a resilient sealing ring seated in a groove provided in one of said members at a location inwardly of said step and sealingly engaging the other of said members; a resilient snap ring inserted into an annular groove formed in one of said members and engaging the other of said members at a location outwardly of said step, said last-mentioned groove having an inclined wall and said snap-ring having a tapered portion in engagement with said inclined wall; and means for closing the other end of said housing member.

3. In a housing structure for a dynamoelectric machine having a removable rotor and a removable stator, the combination comprising a tubular housing member; a stator retaining annular member inserted in an end of said housing, said annular member having a central opening therein of sufficient size to permit passage of said rotor; a rotor retaining member inserted into said annular member and conforming to said opening; a first resilient sealing ring seated in a groove provided in one of said housing and said annular members, and sealingly engaging the other of said members; a second resilient sealing ring seated in a groove provided in one of said annular and said rotor retaining members and sealingly engaging the other of said members; a first resilient snap ring inserted into an annular groove formed in one of said housing and said annular members and engaging the other of said members; a second resilient snap ring inserted into an annular groove formed in one of said annular and rotor retaining members and engaging the other of said members; and means for closing the other end of said housing member.

4. In a housing structure for a dynamo-electric machine, the combination comprising a tubular housing member having the opening at one end formed with an outward step to provide an enlarged outer end opening; an annular stator retaining member having a stepped configuration at both its outer and inner peripheries to provide at its outer periphery an inward portion closely fitting within said housing inwardly of said housing step and an outer portion relatively closely fitting within said end opening and to provide an inner periphery having an outward step forming an enlarged outer end opening in said annular member; a rotor retaining member also of stepped configuration to provide an inward portion fitting closely within said annular member inwardly of said annlar member step and an outward portion fitting relatively closely in said annular member end opening; a first resilient sealing ring sealed in a groove formed in one of said housing and said annular members and sealingly engaging the other of said members at a location inwardly of said housing step; a second resilient sealing ring sealed in a groove formed in one of said annular and said rotor retaining members and sealingly engaging the other of said members at a location inwardly of said annular member step; a resilient snap ring inserted into an annular groove formed in one of said housing and said annular members and engaging the other of said members at a location outwardly of said housing step; a second resilient snap ring inserted into an annular groove formed in one of said rotor retaining and said annular members and engaging the other of said members at a location outwardly of said annular member step; and means for closing the other end of said housing member.

5. In a housing structure for a dynamo-electric machine having a removable rotor and a removable stator, the combination comprising a tubular housing member; a stator retaining annular member inserted in an end of said housing, said annular member having a central opening therein of sufficient size to permit passage of said rotor; a rotor retaining member inserted into said annular member and conforming to said opening; a first resilient sealing ring seated in a groove formed in one of said housing and said annular members and sealingly engaging the other of said members; a second resilient sealing ring seated in a groove formed in one of said annular and said rotor retaining members and sealingly engaging the other of said members; a first resilient snap ring inserted into an annular groove formed in one of said housing and said annular members and engaging the other of said members; a second resilient snap ring inserted into an annular groove formed in one of said annular and said rotor retaining members and engaging the other of said members, said snap ring grooves each having an inclined wall and said snap rings each having a tapered portion in engagement with said inclined walls, respectively; and means for closing the other end of said housing member.

6. In a housing structure for a dynamoelectric machine having a removable rotor mounted on a shaft and a removable stator, the combination comprising a tubular housing section; a closure disc inserted into an end of said housing section; a stator retaining annulus inserted into the other end of said housing section and engaging said stator partially to support said stator, said retaining annulus having a central opening therein co-extending with the bore of said stator; a rotor retaining disc inserted into said opening and conforming thereto; means for detachably securing said closure disc to said housing section; means for detachably securing said annulus to said housing section and for detachably securing said retaining disc to said annulus; and means coupled to said closure disc and to said retaining disc for rotatively mounting said rotor shaft.

7. In a housing structure for a dynamoelectric machine having a removable rotor mounted on a shaft and a removable stator, the combination comprising a tubular housing member having the opening at each end formed with an outward step to provide an enlarged outer end opening at each end thereof; a closure member also of stepped configuration inserted into an end of said housing member and having an inward portion closely fitting said housing member inwardly of said step, and having an outward portion relatively closely fitting said housing member outwardly of said step; a first resilient sealing ring seated in a groove provided in one of said members at a location inwardly of said step and sealingly engaging the other of said members; a first resilient snap ring inserted into an annular groove formed in one of said members and engaging the other of said members at a location outwardly of said step; a stator retaining annular member inserted in the other end of said housing section and having a central opening core extending with the bore of said stator, said annular member engaging said stator partially to support the stator, said annular member having its inner and outer peripheries formed in a stepped configuration to provide an enlarged outer end opening and to provide an inward portion of said outer periphery closely fitting said housing member inwardly of said housing step and an outward portion of said outer periphery relatively closely fitting said housing member outwardly of said step; a rotor retaining member also of stepped configuration to provide an inward portion closely fitting within said annular member opening inwardly of said annular member step and an outward portion relatively closely fitting in the enlarged outer portion of said annular member opening outwardly of said annular member step; a second resilient sealing ring seated in a groove provided in one of said housing and said annular members at a location inwardly of said housing step and sealingly engaging the other of said members; a second resilient snap ring inserted into an annular groove formed in one of said housing and said annular members and engageing the other of said members at a location outwardly of said housing step; a third resilient sealing ring seated in a groove provided in one of said annular and said rotor retaining members at a location inwardly of said annular member step and sealingly engaging the other of said members; a third resilient snap ring inserted into an annular groove formed in one of said annular and said rotor retaining members and engaging the other of said members at a location outwardly of said annular member step; and means associated with said closure member and said rotor retaining member for supporting said shaft for rotative movement thereof.

8. In a dynamoelectric machine, the combination comprising a tubular housing member, means for closing each end of said housing member, a stator mounted within said housing member, a rotor shaft having a rotor end plate formed integrally therewith and a detachable end plate secured to said shaft, a dynamoelectric rotor structure mounted on said shaft between said end plates, and means coupled to said closing means for supporting said rotor shaft for rotative movement thereof.

9. In a housing structure for a dynamoelectric machine having a removable rotor mounted on a shaft and a removable stator, the combination comprising a tubular housing member; a closure for one end of said housing member; an annular thermal barrier clamped between said closure and said housing member, said barrier having an annular air space therein to divide said housing member into a high temperature region and a low temperature region, said low temperature region being arranged to receive said rotor, said shaft and said stator; a stator retaining annulus inserted in the other end of said housing member, said annulus having a central opening therein coextending with the bore of said stator; a rotor retaining disc inserted in said opening and conforming therewith; means for securing said annulus to said housing member and for securing said disc to said annulus; and antifrictional means secured to said thermal barrier and to said rotor retaining disc for rotatably mounting said rotor and shaft.

10. In a housing structure for a dynamoelectric machine having a removable rotor and shaft and a removable stator, the combination comprising a tubular housing member; a closure for one end of said housing member; a thermal barrier sealingly clamped between said closure and said housing member in spaced relation with said closure, said barrier having a central aperture through which said shaft is extended and having a tubular bearing extension secured thereto and surrounding said aperture, said thermal barrier dividing said housing member into a high temperature region and a low temperature region, said low temperature region being arranged to receive said stator, said rotor and said shaft; a stator retaining annulus inserted in the other end of said housing member; a rotor retaining disc inserted in said annulus and conforming with the inner periphery thereof, said disc having a tubular bearing extension secured thereto in alignment with said first-mentioned bearing extension; a bearing member mounted on each of said extensions and disposed inwardly thereof for engagement with said shaft; means for securing said closure to said one housing member end; and means for securing said annulus to said other housing member end and for securing said disc to said annulus.

11. In a housing structure for a dynamoelectric machine having a removable rotor and shaft and a removable stator, the combination comprising a tubular housing member; a closure for one end of said housing member; an annular thermal barrier clamped between said housing member and said closure in spaced relation to said closure, said barrier having an annular air space therein to divide said housing member into a region of high temperature and a region of low temperature, said low temperature region being arranged to receive said rotor and shaft and said stator; means for securing said closure to said one housing member end; stator retaining and rotor retaining means for closing the other end of said housing member; and antifrictional means secured to said thermal barrier and to said rotor retaining means for rotatably mounting said shaft.

12. In a housing structure for a dynamoelectric machine having a removable rotor and shaft and a removable stator, the combination comprising a tubular housing member; a closure for one end of said housing; an annular thermal barrier mounted within said housing member at a position intermediate the ends of said housing member, said thermal barrier dividing said housing member into a high temperature region and a low temperature region, said low temperature region being removed from said closure and being arranged to receive said rotor and shaft and said stator, said thermal barrier having an opening through which said shaft extends; means for securing said closure to said one housing member end; stator retaining and rotor retaining means for closing the other end of said housing member; and antifrictional means secured to said thermal barrier and to said rotor retaining means for rotatably mounting said shaft.

13. In a housing structure for a dynamoelectric machine having a removable rotor and shaft and a removable stator, the combination comprising a tubular housing member; means for closing each end of said housing member; an annular thermal barrier mounted within said housing member and dividing said housing member into a high temperature region and a low temperature region, said low temperature region being arranged to receive said rotor and shaft and said stator; and antifrictional means coupled to said thermal barrier and to that one of said closing means which is adjacent said low temperature region for rotatably supporting said shaft.

14. In a dynamoelectric machine, the combination comprising a tubular housing member; means for closing each end of said housing member; a thermal barrier mounted within said housing member and dividing said housing member into a high temperature region and a low temperature region; a hollow stator mounted within said low temperature region; a rotor and shaft disposed within said stator; and antifrictional means secured to said thermal barrier and to that one of said closing means which is adjacent said low temperature region for rotatably mounting said shaft.

15. In a dynamoelectric machine, the combination comprising a tubular housing member, means for closing each end of said housing member, a thermal barrier mounted within said housing member and dividing said housing member into a high temperature region and a low temperature region, a hollow stator mounted within said low temperature region, a rotor shaft having a rotor end plate formed integrally therewith and disposed within said stator, a detachable rotor end plate secured to said shaft and spaced from said integral end plate, a dynamoelectric rotor structure mounted on said shaft between said end plates, and antifrictional means secured to said thermal barrier and to that one of said closing means which is adjacent said low temperature region for rotatably mounting said shaft.

16. In a housing structure for a dynamoelectric machine having a removable rotor and shaft and a removable stator, the combination comprising a tubular housing member having the opening at one end formed with an outward step to provide an enlarged outer end opening; a closure member also of stepped configuration to provide an inner portion having a cross section such as to fit closely within said housing inwardly of said step and an outer portion of larger cross section to fit relatively closely in said enlarged outer opening; a resilient sealing ring seated in a groove provided in one of said members at a location inwardly of said step and sealingly engaging the other of said members; a resilient snap ring inserted into an annular groove formed in one of said members and engaging the other of said members at a location outwardly of said step; an annular thermal barrier mounted within said housing member, said thermal barrier dividing said housing member into a high temperature region and a low temperature region arranged to receive said rotor and stator, said thermal barrier having an opening through which said shaft extends; antifrictional means secured to said thermal barrier and to said closure member for rotatably mounting said shaft; and means for closing the other end of said housing member, at least a portion of said last-mentioned means being spaced from said thermal barrier.

17. In a dynamoelectric machine, the combination comprising a tubular housing member; means for closing each end of said housing member; a thermal barrier mounted within said housing member and dividing said housing member into a high temperature region and a low temperature region; a hollow stator mounted within said low temperature region; a rotor and a shaft disposed within said stator; and antifrictional means secured to said thermal barrier for rotatively mounting said shaft.

18. In a dynamoelectric machine, a hollow housing member, a hollow stator mounted within said housing member, a shaft having a rotor mounted thereon disposed within said stator, antifrictional means located within said housing for rotatably mounting said shaft, at least one of said antifrictional means including a sleeve bearing holder disposed adjacent said shaft, a sleeve bearing fixedly mounted in said holder and having one end thereof spaced from said holder, thrust runner means located on said shaft adjacent said one end of said sleeve bearing whereby said one end of said sleeve bearing and said thrust runner means cooperate to absorb axial thrust on said shaft.

19. In a dynamoelectric machine, a hollow housing member, a hollow stator mounted within said housing member, a shaft having a rotor mounted thereon disposed within said stator, antifrictional means located within said housing for rotatably mounting said shaft, at least one of said antifrictional means including a sleeve bearing holder disposed adjacent said shaft, a sleeve bearing fixedly mounted in said holder and having one end thereof spaced from said holder, a journal secured to said shaft and located to engage said sleeve bearing, said journal having an outwardly extending flange thereon located adjacent said one end of said sleeve bearing whereby said flange and said one end of said sleeve bearing cooperate to absorb axial thrust on said shaft.

20. In a dynamoelectric machine, a hollow housing member, a hollow stator mounted within said housing member, a shaft having a rotor mounted thereon disposed within said stator, antifrictional means located within said housing for rotatably mounting said shaft, at least one of said antifrictional means comprising a sleeve bearing, a journal secured to said shaft and located to be engaged by said sleeve bearing, thrust pad means located in said housing adjacent said journal and said journal having an outwardly extending flange thereon located to engage said thrust pad means to absorb axial thrust on said shaft.

21. In a dynamoelectric machine, a hollow housing member, a hollow stator mounted within said housing member, a shaft having a rotor mounted thereon and disposed within said stator, antifrictional means located within said housing for rotatably mounting said shaft, said antifrictional means including a pair of sleeve bearing holders spacedly located along said shaft, sleeve bearings coupled to said holders respectively with the opposed end surfaces of said sleeve bearings being spaced from said holders, a pair of journals secured to said shaft adjacent said sleeve bearings respectively and located to engage the latter, each of said journals having an outwardly extending flange formed thereon located adjacent said end surfaces of said sleeve bearings respectively whereby said flanges and said end surfaces cooperate to absorb axial thrust along said shaft.

22. In a housing structure for a dynamoelectric machine having a high temperature region and a low temperature region, the combination comprising casing members for each of said regions, a thermal barrier located between said regions, means for securing the adjacent ends of said casing members together with said thermal barrier clamped therebetween, said thermal barrier including a pair of spaced members defining a cavity therebetween, a spacer member located between said spaced members and shaped to completely enclose said cavity, at least a portion of said spaced members and said spacer member being formed to be coextensive with said ends of said casing members so that said securing means cooperates to sealingly enclose said cavity, and dynamoelectric means located in said low temperature casing member.

23. In a housing structure for a dynamoelectric machine having a low temperature region and a high temperature region, the combination comprising a hollow casing for each of said regions, each of said casings having a flange located on an end surface thereof, a thermal barrier located in said housing structure adjacent each of said last mentioned ends to separate said regions, said thermal barrier including a pair of said spaced members defining a cavity therebetween, a segmented spacer disposed between said members, at least a portion of each of the segments of said spacer and each of said spaced members being coextensive with at least a portion of said end surfaces of each of said casings, securing means coupled to each of said flanges for securing said casings together with said thermal barrier clamped therebetween so that said securing means fixedly locates said spacer segments relative to said spaced members, and dynamoelectric means located in the low temperature region of said housing structure.

24. A dynamoelectric machine comprising a tubular housing having a hollow stator mounted therein, a shaft disposed within said stator, a rotor mounted on said shaft in alignment with said stator, a closure secured to one end of said housing and spaced from one end of said shaft, first antifrictional means mounted in said housing to engage said shaft between said rotor and said one end of said shaft, a closure secured to the other end of said housing and having an annular portion, said shaft having its other end extending through the opening in said annular closure portion, second antifrictional means mounted in said housing adjacent said other end thereof and located to engage said shaft between said other end of said housing and the adjacent end of said rotor, fluid lubricating means located in said housing for lubricating said antifrictional means, means for inducing circulation of said lubricating means to both of said antifrictional means comprising an axial passage through said shaft extending from said one end thereof to at least the portion of said shaft located between said second antifrictional means and said annular closure portion, said portion of said shaft having at least one radial passage formed therein and communicating with said axial passage so that upon rotation of said shaft said lubricant is circulated from said one end of said shaft through said axial and said radial passages to said second antifrictional means and from the latter through the gap between said rotor and said stator to said first antifrictional means, and sealing means located adjacent the opening in said annular closure portion to prevent the flow of lubricant therethrough.

25. In a dynamoelectric machine, the combination comprising a tubular housing member, means for closing each end of said housing member, a stator mounted within said housing member, a rotor shaft having a rotor end plate formed integrally therewith, a detachable end plate secured to said shaft, a dynamoelectric rotor structure mounted on said shaft between said end plates, a sleeve bearing mounted in said housing and located adjacent each of said rotor end plates, and a journal coupled to each of said sleeve bearings, one of said journals being secured to said detachable end plate.

26. In a dynamoelectric machine having a removable rotor mounted on a shaft, the combination comprising a tubular housing section, a closure secured to one end of said housing section, an annular stator mounted in said housing and forming a rotor bore, a closure secured to the other end of said housing, said last-mentioned closure including a detachable disk coextending with the bore of said stator, a shaft removably mounted in the bore of said stator, a rotor mounted on said shaft in alignment with said stator, a journal secured to said shaft at each end of said rotor, a pair of sleeve bearings mounted in said housing section and coupled to said journals respectively, means for securing one of said sleeve bearings to said detachable disk, and each of said journals being formed from a less wear resistant material than said sleeve bearings so that repair of said bearings is accomplished by replacement of said journals on said removable shaft.

27. In a dynamoelectric machine the combination comprising a tubular housing member, means for closing each end of said housing member, an annular thermal barrier mounted within said housing member and dividing said housing member into a high temperature region and a low temperature region, said thermal barrier including an annular cavity therein with said cavity extending inwardly from the outer periphery of said thermal barrier, a ring member secured to said thermal barrier adjacent the outer periphery of said cavity for closing said cavity, a hollow stator mounted within said low temperature region, a rotor and shaft disposed within said stator, antifrictional means mounted in said low temperature region for rotatably mounting said shaft, said shaft including a portion which extends through the opening in said thremal barrier, and annular sealing means disposed adjacent said thermal barrier and said shaft portion, with said sealing means closely receiving said shaft portion.

References Cited in the file of this patent

UNITED STATES PATENTS

| | | |
|---|---|---|
| 2,107,481 | Johnson | Feb. 8, 1938 |
| 2,460,418 | Hart | Feb. 1, 1949 |
| 2,698,911 | Schaefer | Jan. 4, 1955 |
| 2,727,164 | Radice | Dec. 13, 1955 |
| 2,730,636 | Dunn | Jan. 10, 1956 |
| 2,741,990 | White | Apr. 17, 1956 |
| 2,768,584 | Nicol et al. | Oct. 30, 1956 |